United States Patent [19]
Dulik et al.

[11] Patent Number: 5,357,710
[45] Date of Patent: Oct. 25, 1994

[54] PLANT WATERING TRELLIS

[75] Inventors: Robert E. Dulik, 23 McKinley Ave., Uniontown, Pa. 15401; Daniel A. Dulik, Belle Vernon, Pa.

[73] Assignee: Robert E. Dulik, Uniontown, Pa.

[21] Appl. No.: 119,977

[22] Filed: Sep. 10, 1993

[51] Int. Cl.⁵ ............................................. A01G 29/00
[52] U.S. Cl. .................................................... 47/48.5
[58] Field of Search ................... 47/48.5, 45 R, 27 C

[56] References Cited

U.S. PATENT DOCUMENTS

| | | |
|---|---|---|
| 1,361,464 | 12/1920 | Hunt . |
| 1,903,122 | 3/1933 | Merz et al. . |
| 2,359,981 | 10/1944 | Fleming .................... 47/48.5 |
| 3,361,363 | 1/1968 | Babington ................. 47/48.5 |
| 3,425,630 | 2/1969 | Fessler, Sr. .............. 47/48.5 M |
| 3,559,339 | 2/1971 | Worley . |
| 3,579,908 | 5/1971 | Morgan .................... 47/48.5 M |
| 3,638,814 | 2/1972 | Lowery . |
| 3,793,771 | 2/1974 | Slaughter . |
| 3,865,309 | 2/1975 | Greenhalgh ............... 239/268 |
| 4,007,158 | 3/1978 | England .................... 47/17 R |
| 4,073,091 | 2/1978 | Vogel . |
| 4,610,106 | 9/1986 | Robinson . |
| 4,616,442 | 10/1986 | Lenzner . |
| 4,763,440 | 8/1988 | James . |
| 4,869,018 | 9/1989 | Scales et al. ............. 47/48.5 M |
| 4,922,653 | 5/1990 | Stone . |
| 5,007,587 | 4/1991 | Daroca ..................... 47/48.5 M |

FOREIGN PATENT DOCUMENTS

| | | | |
|---|---|---|---|
| 1226735 | 9/1987 | Canada ................. | 47/27 C |
| 1491594 | 7/1967 | France ................. | 47/27 C |

Primary Examiner—Ramon S. Britts
Assistant Examiner—Joanne C. Downs
Attorney, Agent, or Firm—Webb Ziesenheim Bruening Logsdon

[57] ABSTRACT

A plant watering trellis includes a plurality of vertical support posts with a plurality of bottom frame members connected to the support posts. The bottom frame members are configured for carrying liquid therein, with at least one of the bottom frame members including a plurality of orifices for distributing the liquid along the length of the bottom frame member. A first coupler is in fluid communication with one of the bottom frame members and couples the trellis to a fluid source. A plurality of upper frame members is connected to an upper end of the support posts. A plant support extends between the top and bottom frame members. A second coupler allows for the interlinking of adjacent plant watering trellises.

20 Claims, 3 Drawing Sheets

PLANT WATERING TRELLIS

BACKGROUND OF THE INVENTION

1. Field of the Invention

The present invention relates to a plant supporting structure and, more particularly, to a plant watering trellis.

2. Description of the Prior Art

It is well-known that certain plants need to be supported during their growth. This is a particular concern for certain vegetable plants, such as tomatoes, which become too tall and heavy with the growing vegetables for their stalks to provide effective support. It may also be desirable to lift the vegetables off the ground for more effective growth and to keep them clean and disease-free.

Many arrangements have been provided for supporting plants during their growth, from simple stakes to which the plants are tied, to more complicated structures which support the plants without tying and through which the plants intertwine while growing. Some plant support structures may also provide for watering or feeding of the plants during their growth cycle. Examples of prior art arrangements are shown in U.S. Pat. Nos. 1,361,464; 1,903,122; 3,559,339; 3,638,814; 3,793,771; 4,073,091; 4,610,106; 4,616,442; 4,922,653 and 4,763,440.

While many of these prior arrangements do provide adequate support for and/or watering of the growing plants, they have a number of disadvantages which reduce their usefulness. Many of the devices are complicated structures which are expensive to manufacture and difficult to assemble and disassemble. In addition, many of the devices are not readily collapsible into a small, easily handled size, and storage of the device in the non-growing season becomes a problem. The watering type supports are generally stand-alone devices which require their own supply of water.

It is, therefore, an object of the present invention to provide a plant support which also permits easy and thorough watering of the plants. It is a further object of the present invention to provide such a plant support in an arrangement which is not complicated, is inexpensive to manufacture and is easy to assemble and disassemble. It is also an object of the present invention to provide a plant support in an arrangement which is lightweight and can be readily stored in a small bundle when not in use, yet is strong enough to support a plurality of growing plants. Finally, it is an object of the present invention to provide a plant support that can carry water from a single water supply to a plurality of plant supports in an interconnected series.

SUMMARY OF THE INVENTION

Accordingly, we have developed a plant watering trellis which includes a plurality of support posts with a plurality of bottom frame members connected to the support posts. The bottom frame members are configured for carrying liquid therein with at least one of the bottom frame members including a plurality of orifices for distributing the liquid along the length of the bottom frame member. A first coupling device in fluid communication with one of the bottom frame members is provided for coupling the bottom frame members to an adjacent fluid transportation system. The fluid transportation system may be a fluid source, such as a garden hose, an adjacent plant watering trellis or another fluid transportation system. A plurality of top frame members positioned above and spaced from the bottom frame members is connected to the support posts with a plant supporting structure extending between and coupled to the top and bottom frame members.

A second coupling device may be provided which is in fluid communication with one of the bottom frame members for coupling the plurality of bottom frame members to another fluid transportation system. Specifically, the second coupling device is configured to be coupled to a first coupling device of an adjacent plant watering trellis. This interconnection of plant watering trellises forms a plant watering system according to the present invention. A removable cap is provided with the second coupling device for sealing the second coupling device when not coupled to another fluid transportation system. The cap would be used when a plant watering trellis is used alone or is the last in an interconnected series of such trellises. The second coupling device may also be attached to other fluid transportation systems such as existing garden or sprinkling hoses.

The plant supporting structure may be formed as a plurality of spaced plant support lines extending between and connected to the top and bottom frame members. In an alternative embodiment of the present invention, the plant supporting structure may be a mesh structure extending between the top and bottom frame members.

The support posts and the top and bottom frame members may be formed of hollow, tubular members which are easily assembled and disassembled. The bottom frame members may be removably connected to the support posts by brackets which are secured in position by nut and bolt fasteners, and the top frame members may be removably connected to the support posts by nut and bolt fasteners. This construction makes the plant watering trellis easily assembled and disassembled.

The support posts may include spiked lower ends extending below the bottom frame members and configured to penetrate into the ground to support the plant watering trellis. Brace members may extend between and connect to the support posts and the top frame members for additional support. The brace members may be connected by nut and bolt fasteners for easy assembly and disassembly.

BRIEF DESCRIPTION OF THE PREFERRED EMBODIMENTS

Figures 1, 4:
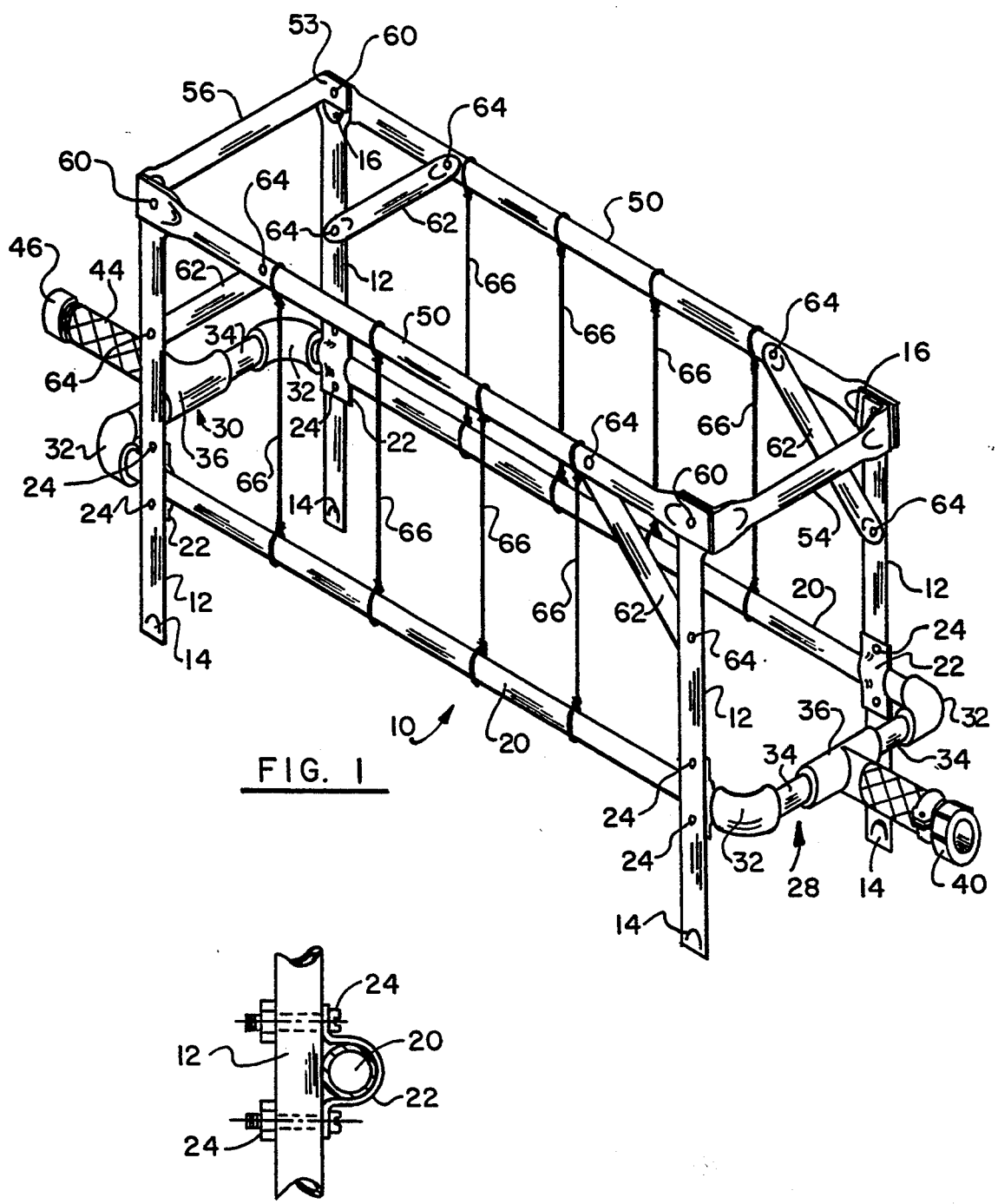
FIG. 1 is a perspective view of one embodiment of a plant watering trellis according to the present invention.
FIG. 4 is an enlarged cross-sectional view of a portion of the plant watering trellis shown in FIG. 1.
Figure 2:
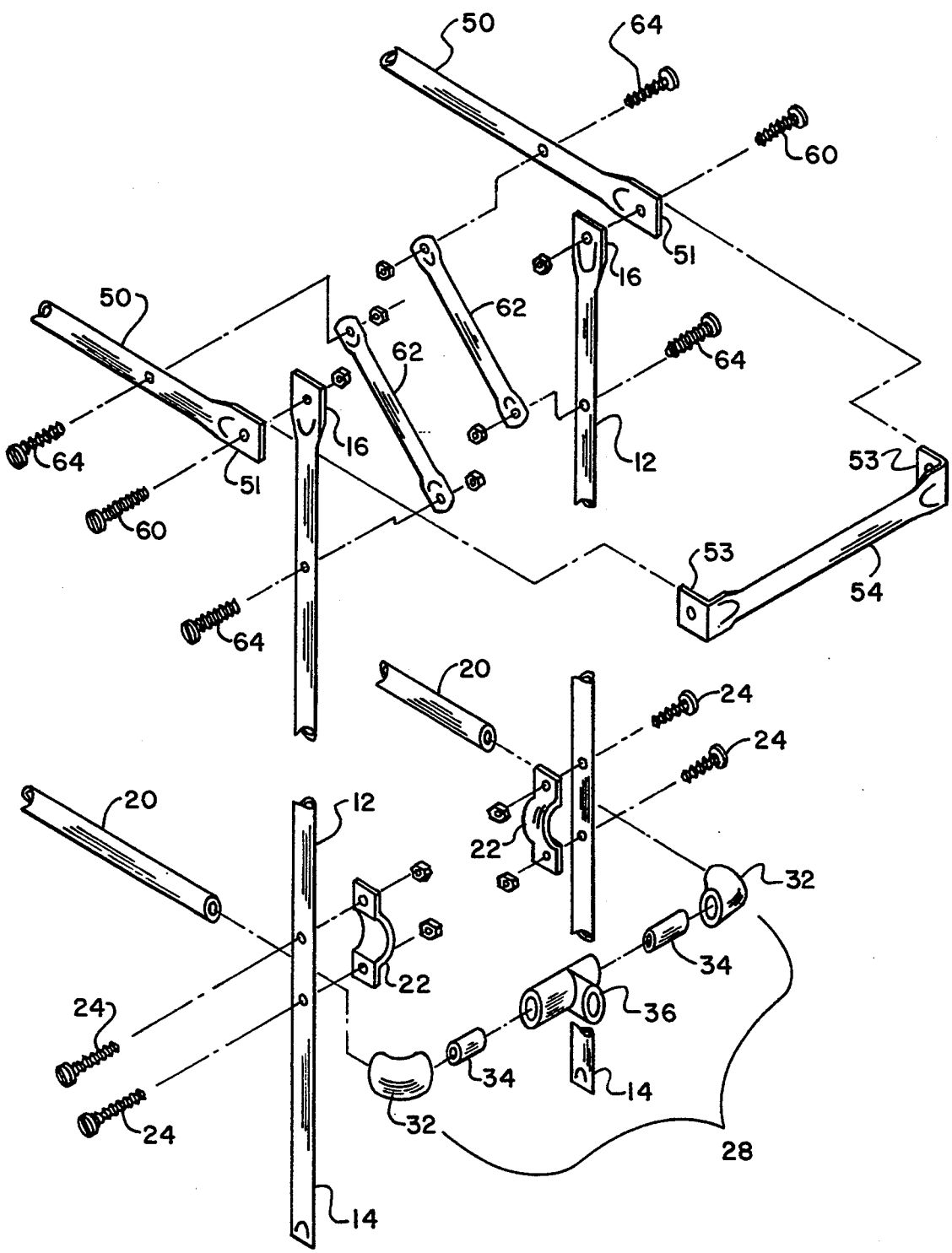
FIG. 2 is an exploded view of a portion of the plant watering trellis shown in FIG. 1.
Figure 3:
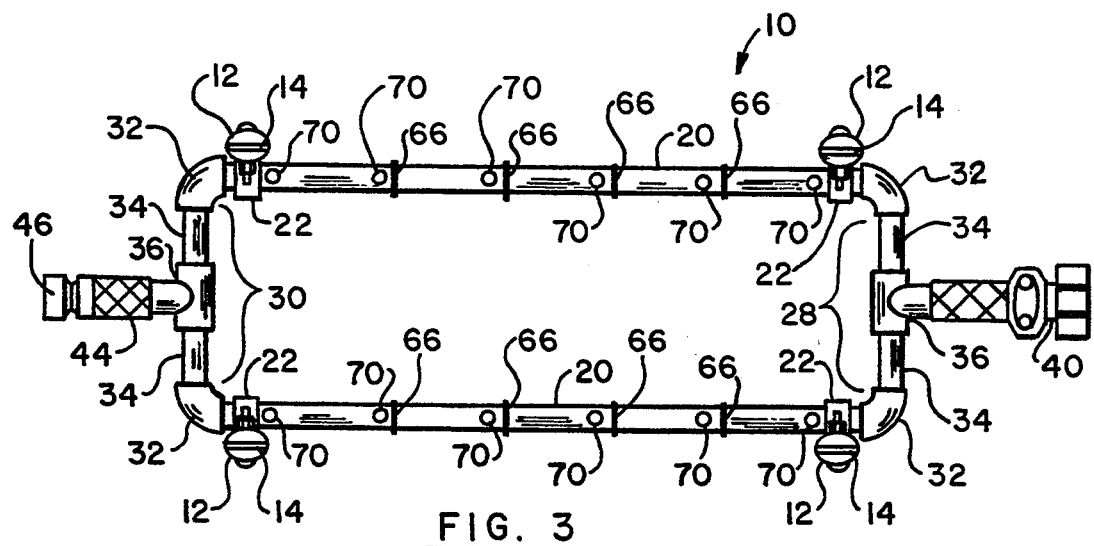
FIG. 3 is a bottom view of the plant watering trellis shown in FIG. 1.

FIGS. 1-3 illustrate one embodiment of a plant watering trellis 10 according to the present invention. The plant watering trellis 10 includes four substantially vertical support posts 12 each having a spiked lower end 14 and a flattened upper end 16. A pair of spaced and parallel, hollow, horizontal side bottom frame members 20 are connected to the support posts 12 between the spiked lower end 14 and the flattened upper end 16 by a plurality of brackets 22 which extend around the side bottom frame members 20 and which are secured in position by nut and bolt fastener 24 extending through the support posts 12. The attachment of the side bottom frame members 20 to the support posts 12 is shown in more detail in FIG. 4.

Referring to FIGS. 1-3, hollow horizontal front and back bottom frame members 28 and 30, respectively, interconnect the side bottom frame members 20 and are spaced and parallel to each other. The bottom frame members 20, 28 and 30 are in fluid communication with each other and are arranged in a substantially horizontal rectangular configuration with the support posts 12 positioned adjacent the corners of the rectangular configuration. The hollow front and back bottom frame members 28 and 30 each include two elbow connectors 32 attached to the side bottom frame members 20, and two connecting tubes 34 extending to a standard T-type connection 36. The T-type connection 36 of the front bottom frame member 28 is attached to a female hose coupling 40 of a conventional type. The T-type connection 36 of the back bottom base member 30 is attached to a conventional male hose coupling 44. A removable cap 46 seals the male hose coupling 44. Both the female hose coupling 40 and the male hose coupling 44 are in fluid communication with the base members 20, 28 and 30, as will be described hereinafter.

A pair of spaced and parallel side top frame members 50 is connected to the flattened upper ends 16 of the support posts 12. The side top frame members 50 are parallel to and spaced from side bottom frame members 20. Front and back top frame members 54 and 56, respectively, are also connected to the flattened upper ends 16 of the support posts 12. Front and back top frame members 54 and 56 are spaced from and substantially parallel to front and back bottom frame members 28 and 30. The ends 51 of the side top frame members 50 are also flattened and the ends 53 of the front and back top frame members 54 and 56 are flattened and bent 90° for easier attachment to the flattened upper ends 16 of the support posts 12 as shown in FIG. 2. The top frame members 50, 54 and 56 are secured to the support posts 12 by a removable nut and bolt fastener 60. The top frame members 50, 54 and 56 are formed in a rectangular configuration with the support posts 12 positioned in the corners of the rectangular configuration.

A brace member 62 extends from each support post 12 to an adjacent side top frame member 50. The brace members 62 are preferably secured to the support posts 12 and side top frame members 50 by removable nut and bolt fasteners 64.

Figure 5:
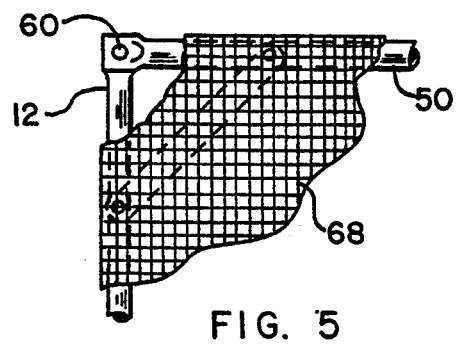
FIG. 5 is a side view, partially broken away, of a portion of a second embodiment of a plant watering trellis according to the present invention.

Four spaced plant support lines 66 extend between and are tied at their ends to each top side frame member 50 and the adjacent side bottom frame member 20 which is connected to the same support posts 12 as the top side frame member 50, providing a trellis or supporting device for growing plants. In an alternative embodiment of the present invention illustrated in FIG. 5, the plant support lines 66 may be replaced with a mesh structure 68 extending between and affixed to side top frame members 50 and adjacent side bottom frame members 20.

The bottom of each side bottom frame member 20 is provided with a plurality of orifices 70 each extending into the hollow interior of the bottom frame member 20 and spaced along the length of the side bottom frame members 20, as shown in FIG. 3. The plurality of orifices 70 allows for the distribution of liquid along the length of each side bottom frame member 20, as will be described hereinafter.

Figure 6:
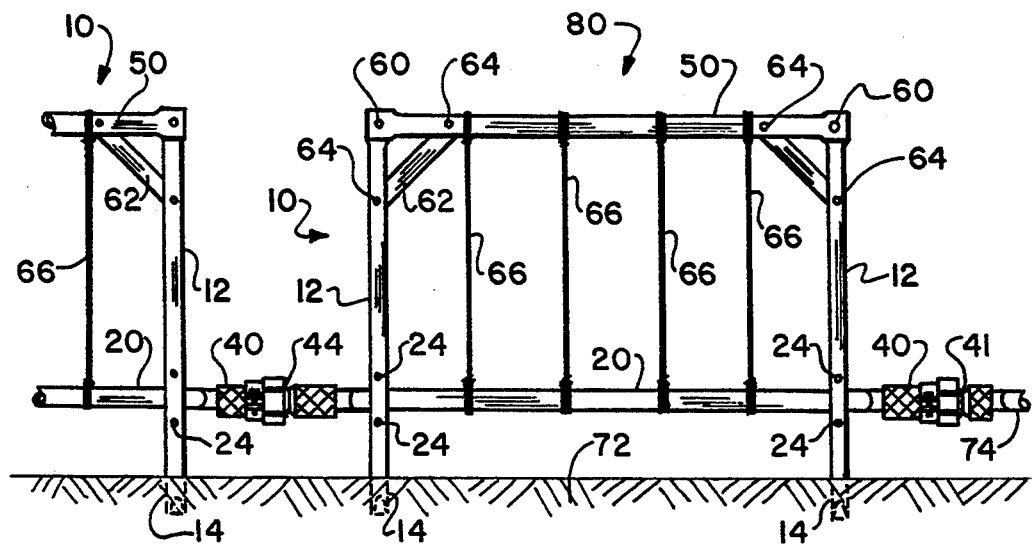
FIG. 6 is a side view of a plant watering system according to the present invention utilizing a plurality of the plant watering trellises shown in FIG. 1.

The present invention provides for a plant watering trellis system 80 which includes a plurality of interconnected plant watering trellises 10, as shown in FIG. 6. In the plant watering trellis system 80, the first in the serially connected plant watering trellises 10 is connected to a fluid source 74. The final plant watering trellis 10 in the series would include cap 46 on the male hose coupling 44 unless attached to a further fluid transportation system.

The plant watering trellis 10 of the present invention is preferably formed of one-half inch galvanized steel conduit of the following lengths: two pieces 96" long for forming the side bottom frame members 20; two pieces 96" long for forming the side top frame members 50; four pieces 80" long for forming support posts 12; six pieces 26" long for forming the front and back top frame members 54 and 56 and the four brace members 62; and two pieces 39" long for constructing the front and back bottom frame members 28 and 30. Plastic pipe fittings can be utilized for the T-type connections 36 and elbow connectors 32. The connecting tubes 34 can be formed of one-half inch galvanized steel conduit, the specific lengths of which will depend upon the specific T-type connection 36 and elbow connectors 32 which are utilized. However, all four connecting tubes 34 may be formed from a single tube 50" long. This construction yields an easily assembled and disassembled plant watering trellis 10 with sufficient rigidity to transport water and support plants while maintaining an overall lightweight characteristic enabling easy transportation of the plant watering trellis 10. The plant watering trellis 10 described above is configured to fit into a four inch diameter plastic pipe that is eight feet long when the plant watering trellis 10 is in the disassembled state.

In operation, the plant watering trellis 10 of the present invention is secured in position by placing the spiked lower ends 14 of the support posts 12 firmly into the ground 72 as shown in FIG. 6. The female hose coupling 40 is attached to a fluid transportation system such as a fluid source 74 (i.e., a hose) or an adjacent plant watering trellis 10. During watering or feeding, fluid from the fluid source 74 will flow into the base members 20, 28 and 30 through the adjacent fluid transportation system and the female hose coupling 40. The plurality of orifices 70 along the bottom of side bottom frame members 20 provides for distributing the fluid along the length of the side bottom frame members 20 and thereby feed and/or water the plants along the side bottom frame members 20. The male hose coupling 44 allows for attachment to a subsequent fluid transportation system such as an adjacent plant watering trellis 10 as shown in FIG. 6.

The plant watering trellis 10 of the present invention will preferably be situated above a grouping of twelve plants positioned in two rows, spaced 24" apart representing the approximate width or spacing between the side bottom frame members 20. Each row of plants will have four plants substantially aligned with the four plant lines 66 extending between the side bottom frame member 20 and the side top frame member 50. Four additional plants will be aligned substantially adjacent the support posts 12. Immediately after planting, the plant watering trellis 10 of the present invention will serve as a marking device to indicate where the appropriate seedling should be sprouting. Additionally, during the early spring the plant watering trellis 10 may be utilized to provide protection against frost. At appropriate times, the spiked ends 14 of the support posts 12 for the plant watering trellis 10 can be lifted up out of the ground 72 and the plant watering trellis 10 can be positioned on its side to be utilized as a frame for supporting a plastic or other protective covering over the seedlings to create a greenhouse effect and protect them from frost. The lightweight construction of the plant watering trellis 10 makes this operation reasonably simple. When the plants have grown to the appropriate size, and the plant watering trellis 10 has been positioned upright with the spiked ends 14 of the support posts 12 securely fastened within the ground 72, the plants may be attached to an appropriate plant line 66, if needed, or simply allowed to grow up a plant line 66 in a conventional fashion.

It will be apparent that various modifications may be made to the present invention without departing from the spirit and scope thereof. For example, since the support posts 12 and the top frame members 50, 54 and 56 are also formed of hollow, tubular members, they may be adapted to carry and distribute fluid in a similar manner to the side base members 20. This modification would require a change in the method of attachment of these members as well as providing fluid communication between the support posts 12 and the bottom frame members 20. Additionally, the orifices 70 may be provided on opposing sides of the side bottom frame members 20 to provide for a distribution of water along two rows. Additionally, alternative connection means may be utilized for any of the elements of the present invention.

The plant watering trellis 10 of the present invention provides a lightweight, easily transportable, easily assembled and disassembled plant watering trellis which can be used individually or connected to a series of plant watering trellises as needed. These and other advantageous features are a result of the unique configuration of the plant watering trellis of the present design.

Having described above the presently preferred embodiments of the present invention, it is to be understood that it may be otherwise embodied within the scope of the appended claims.

We claim:

1. A plant watering trellis comprising:
    a plurality of support posts;
    a plurality of bottom frame members connected to said support posts, said bottom frame members configured for carrying liquid therein, with at least one of said bottom frame members including a plurality of orifices for distributing the liquid along the length of said bottom frame member;
    a first coupling means in fluid communication with one of said bottom frame members for coupling said bottom frame members to a fluid transportation system;
    a plurality of top frame members positioned above and spaced from said bottom frame members and connected to said support posts;
    a plurality of brace members extending from said top frame members to said support posts and connected thereto; and
    plant supporting means extending between and connected to said top and bottom frame members.

2. The plant watering trellis of claim 1 further including a second coupling means in fluid communication with one of said bottom frame members for coupling said plurality of bottom frame members to a fluid transportation system.

3. The plant watering trellis of claim 2 wherein said second coupling means is configured to be coupled to a first coupling means of an adjacent plant watering trellis.

4. The plant watering trellis of claim 1 wherein each said support post includes a spiked end extending below said bottom frame members.

5. The plant watering trellis of claim 1 wherein said plant supporting means is a plurality of spaced plant support lines.

6. The plant watering trellis of claim 1 wherein said plant supporting means is a mesh structure.

7. The plant watering trellis of claim 1 wherein said support posts and said top and bottom frame members are formed of hollow, tubular members.

8. The plant watering trellis of claim 1 wherein said bottom frame members are removably connected to said support posts by brackets which extend around said bottom frame members and which are secured to said support posts by bolts.

9. The plant watering trellis of claim 1 wherein four support posts are provided and wherein said top and bottom frame members are formed in rectangular configurations.

10. The plant watering trellis of claim 9 wherein two of said bottom frame members form sides of said rectangular configuration and include said plurality of orifices therein.

11. The plant watering trellis of claim 10 wherein said first coupling means is in fluid communication with one of said bottom frame members which extend between said two bottom frame members forming said sides of said rectangular configuration.

12. A plant watering trellis system comprising a plurality of interconnected plant watering trellises, each said plant watering trellis including:
    a plurality of support posts;
    a plurality of bottom frame members connected to said support posts, said bottom frame members configured for carrying liquid therein, with at least one of said bottom frame members including a plurality of orifices for distributing the liquid along the length of said bottom frame member;
    a first coupling means in fluid communication with one of said bottom frame members for coupling said plurality of bottom frame members to a fluid transportation system;
    a second coupling means in fluid communication with one of said bottom frame members and configured to couple said plurality of bottom frame members to a first coupling means of an adjacent plant watering trellis;
    a plurality of top frame members positioned above and spaced from said bottom frame members and connected to said support posts;

a plurality of brace members extending from said top frame members to said support posts; and plant supporting means extending between said top and bottom frame members.

13. The plant watering trellis system of claim 12 wherein said plant supporting means of each said plant watering trellis is a plurality of spaced plant support lines.

14. The plant watering trellis system of claim 12 wherein each said plant watering trellis includes four support posts and wherein said top and bottom frame members are formed in a rectangular configuration.

15. The plant watering trellis system of claim 14 wherein two of said top frame members of each said plant watering trellis form sides of said rectangular configuration and include said plurality of orifices.

16. The plant watering trellis system of claim 15 wherein said first coupling means of each said plant watering trellis is in fluid communication with one of said bottom frame members extending between said two top frame members forming said sides of said rectangular configuration.

17. The plant watering trellis system of claim 16 wherein said second coupling means of each said plant watering trellis is in fluid communication with one of said bottom frame members extending between said two bottom frame members which form said sides of said rectangular configuration.

18. A plant watering trellis comprising:
four vertical support posts, each said support post having a spiked lower end and a flattened upper end;
a plurality of horizontal, hollow bottom frame members removably connected to said support posts by brackets and positioned between said support post ends in a rectangular configuration with said support posts positioned at adjacent corners of said rectangular configuration;
said bottom frame members configured for carrying liquid therein and including a front bottom frame member, a pair of spaced and parallel side bottom frame members, and a back bottom frame member spaced and parallel to said front bottom frame member, and a plurality of orifices provided in a surface of said side bottom frame members facing said spiked lower end of said support post for distributing liquid along said side bottom frame members;
a first coupling means in fluid communication with said front bottom frame member for coupling said bottom frame members to a fluid transportation system;
a second coupling means in fluid communication with said back bottom frame member for coupling said bottom frame members to a second fluid transportation system, wherein said second coupling means is configured to be connected to a first coupling means of an adjacent plant watering trellis, said second coupling means including a removable cap for sealing said second coupling means when not coupled to said second fluid transportation system;
a plurality of horizontal top frame members positioned above and spaced from said bottom frame members and removably connected to said support posts at said flattened upper end of said support posts and positioned in a rectangular configuration, with said support posts positioned within corners of said rectangular configuration of said top frame members, said horizontal top frame members including a pair of spaced and parallel side top frame members having flattened ends which are removably connected to said flattened upper ends of said support posts, a front top frame member with flattened ends positioned perpendicular to the axis of said front top frame member and removably connected to said flattened upper ends of two of said support posts, and a back top frame member spaced from said top frame member and with its flattened ends positioned perpendicular to the axis of said back top frame member and removably connected to said flattened upper ends of two of said support posts;
four brace members, each of which extend between and are removably connected to one of said support posts and an adjacent one of said side top frame members; and
plant supporting means extending between and connected to said top and bottom frame members.

19. A plant watering trellis comprising:
a plurality of support posts;
a plurality of bottom frame members connected to said support posts, said bottom frame members configured for carrying liquid therein, with at least one of said bottom frame members including a plurality of orifices for distributing the liquid along the length of said bottom frame member;
a first coupling means in fluid communication with one of said bottom frame members for coupling said bottom frame members to a fluid transportation system;
a plurality of top frame members positioned above and spaced from said bottom frame members and connected to said support posts; and
a plurality of spaced plant support lines extending between and connected to said top and bottom frame members.

20. A plant watering trellis system comprising a plurality of interconnected plant watering trellises, each said plant watering trellis including:
a plurality of support posts;
a plurality of bottom frame members connected to said support posts, said bottom frame members configured for carrying liquid therein, with at least one of said bottom frame members including a plurality of orifices for distributing the liquid along the length of said bottom frame member;
a first coupling means in fluid communication with one of said bottom frame members for coupling said plurality of bottom frame members to a fluid transportation system;
a second coupling means in fluid communication with one of said bottom frame members and configured to couple said plurality of bottom frame members to a first coupling means of an adjacent plant watering trellis;
a plurality of top frame members positioned above and spaced from said bottom frame members and connected to said support posts; and
a plurality of spaced plant support lines extending between said top and bottom frame members.

* * * * *

UNITED STATES PATENT AND TRADEMARK OFFICE
CERTIFICATE OF CORRECTION

PATENT NO. : 5,357,710
DATED : October 25, 1994
INVENTOR(S) : Robert E. Dulik and Daniel A. Dulik It is certified that error appears in the above-indentified patent and that said Letters Patent is hereby corrected as shown below:

Column 4 Line 31 "39" " should read --19"--.

Signed and Sealed this

Twentieth Day of December, 1994

Attest:

BRUCE LEHMAN

*Attesting Officer*     *Commissioner of Patents and Trademarks*